Aug. 28, 1956  E. M. WORMSER  2,761,072
TOTAL-RADIATION PYROMETER
Filed June 30, 1951  2 Sheets-Sheet 1
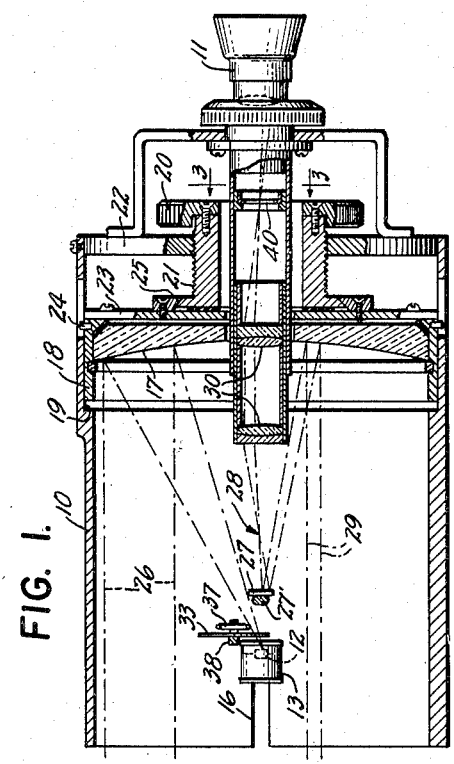
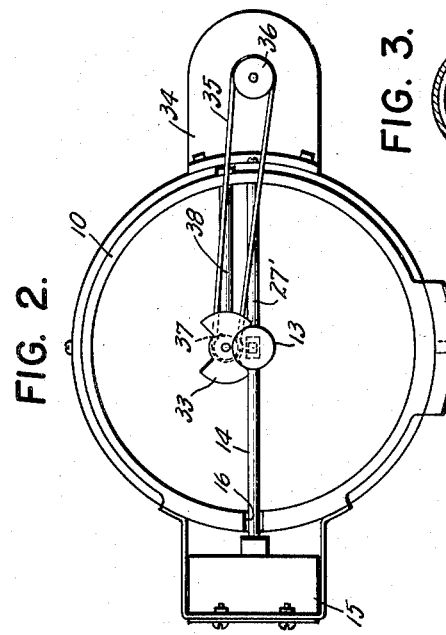
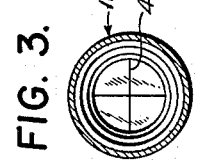
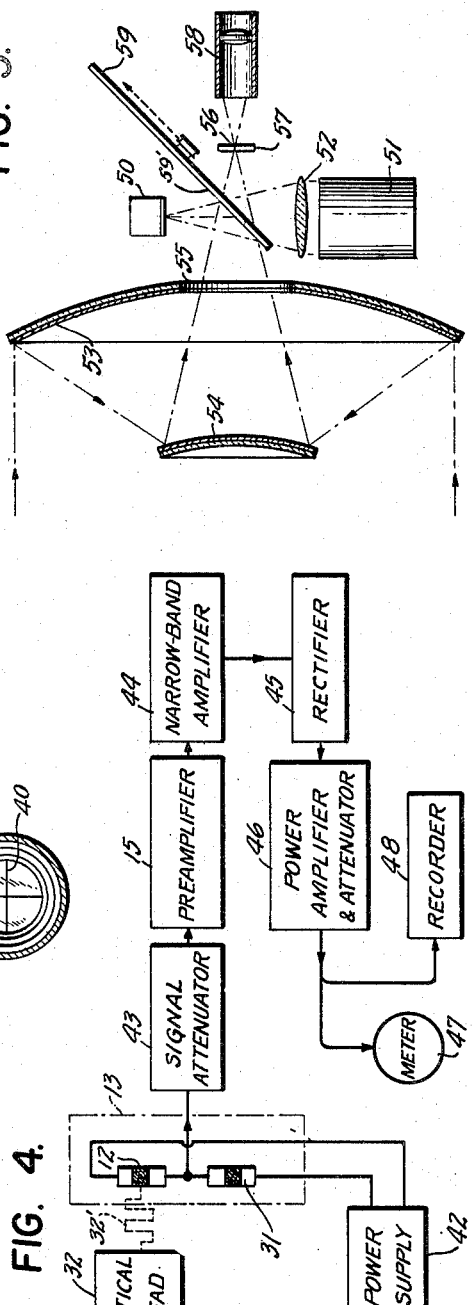
Inventor
*ERIC M. WORMSER*
By *Mitchell & Bechert*
Attorneys Aug. 28, 1956

E. M. WORMSER 2,761,072

TOTAL-RADIATION PYROMETER

Filed June 30, 1951

Inventor
ERIC M. WORMSER

By Mitchell Bechert

Attorneys

United States Patent Office 2,761,072
Patented Aug. 28, 1956

2,761,072
TOTAL-RADIATION PYROMETER

Eric M. Wormser, New York, N. Y., assignor to Servo Corporation of America, New Hyde Park, N. Y., a corporation of New York Application June 30, 1951, Serial No. 234,483

5 Claims. (Cl. 250—83.3)

My invention relates to radiation pyrometers, that is, to instruments for evaluating the radiation intensity of a given source.

It is an object of the invention to provide an improved device of the character indicated.

It is another object to provide improved means for measuring heat radiation.

It is also an object to provide heat-radiation measuring means employing improved visual-sighting optics.

A further object is to provide improved means for calibrating a radiation pyrometer.

It is a general object to meet the above objects with a compact and easily handled assembly that is simple to use and relatively unaffected by constant abuse.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 1 is a vertical sectional view along the axis of a portable radiation pyrometer incorporating features of the invention;

Fig. 2 is a left-end view of the pyrometer of Fig. 1;

Fig. 3 is an enlarged sectional view of a part of the pyrometer of Fig. 1, as taken in the plane 3—3 of Fig. 1;

Fig. 4 is a simplified block diagram, schematically illustrating electric components which may be utilized in conjunction with optical components of Fig. 1;

Fig. 5 is an optical diagram, schematically illustrating an alternative optical arrangement;

Figure 6:
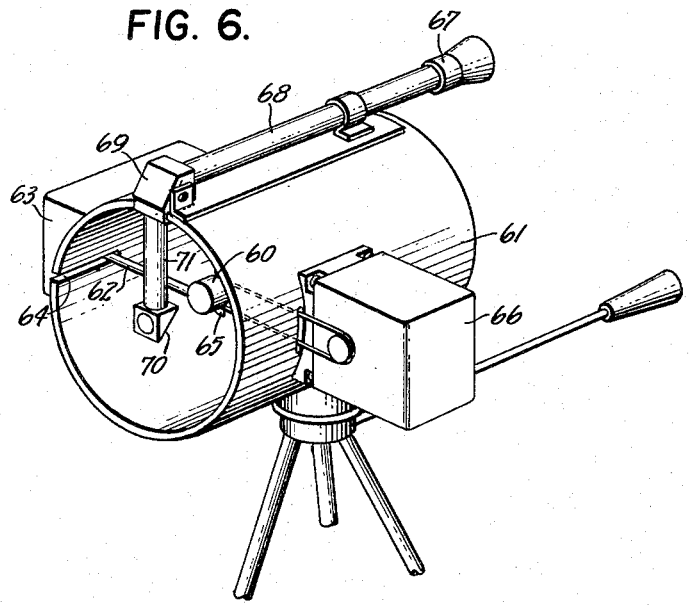
Fig. 6 is a front three-quarter perspective view of a portable pyrometer generally similar to that of Fig. 1 but incorporating slight modifications.

Briefly stated, my invention contemplates novel optical combinations and arrangements for use in radiation-responsive measurements in and near the visible spectrum, as for example in the so-called far-infrared region, out to say 25 microns. Such combinations may utilize visual-sighting optics at least partially in common with, or on a common axis with, the optics for focussing a distant radiation source upon the radiation-responsive means, whereby parallax problems are avoided. Means may be incorporated in, or employed in conjunction with, the radiation-responsive means for effectively chopping the radiation impinging on the radiation-responsive means, whereby the latter may respond quantitatively with respect to a given level. For applications demanding relative accuracy, I have provided means for automatically basing the response on a carefully regulated reference source; and, for even greater accuracy, I disclose means whereby the instrument responsivity of the radiation-responsive means may be checked and calibrated as frequently as desired.

Referring to Figs. 1 to 4 of the drawings, my invention is shown in application to a portable radiation pyrometer in which the optics may be substantially contained in a cylindrical body or housing 10. It is a feature of the embodiment of Figs. 1 to 3 that visual-sighting optics including an eyepiece 11 are lined on an axis common with the axis of the collecting optics for the radiation-responsive means. The radiation-responsive means may comprise a heat-sensitive cell 12 contained in a suitable housing 13 and mounted upon a standard 14 extending radially into the housing 10. In the form shown, microphonics in the heat-responsive means 12 and its associated amplifying means are materially reduced by assembling the housing 13, the standard 14, and preamplifier means 15 together as a unit; this subassembly may be mounted and adjusted as a unit on and within the body or housing 10. A longitudinal slot 16 at the front end of the housing 10 may permit slidable insertion of this heat-responsive assembly in clearance with the standard 14.

The collecting optics may comprise a parabolic mirror 17 mounted at the back end of the body 10. In the form shown, the mirror 17 is carried by a sleeve 18 slidable longitudinally in a counterbore 19 in the housing 10, for focusing purposes. The focusing means shown includes a knurled ring 20 with a shank 21 threaded into a back plate 22 forming part of the pyrometer housing 10. The mirror assembly 17—18 includes a back plate 23 keyed, as at 24, against rotation with respect to the housing 10. A shoulder engagement at 25 between the threaded shank 21 and the mirror backing plate 23 provides a means whereby longitudinal adjustment effected by the knurled ring 20 may be directly translated to the mirror 17 for focusing purposes. The two rays 26 in Fig. 1 illustrate radiation from a distant source (not shown) focused upon the heat-responsive means 12.

In the form of Figs. 1 and 2, I employ a small fixed mirror 27 to intercept a part of the radiation which would otherwise be focused upon the heat-responsive means 12 and to reflect this part of the radiation into the visual-sighting optics. Thus, whenever the mirror 17 is adjusted, as for purposes of focusing on the heat-responsive means 12, the radiation employed for visual sighting will also be focused at an imaginary location 28, spaced conjugate to the plate of the heat-responsive means 12 with respect to the mirror surface 27. Rays, such as the rays 29, intercepted by mirror 27, will thus cross over at the point 28, and the lenses 30 of the visual-sighting optics may be set for focus on this point 28. A cross-hair reticule 40 at a ray crossover in the sighting optics 11 may assist in alignment of the device on a given source to be observed. It will be appreciated that, once adjusted, both the visual-sighting optics and the collecting optics will always be focused at the same collecting distance. Whenever the knurled ring 20 is rotated to focus for another collecting distance, both the sighting optics and the cell will maintain focusing alignment.

The heat-responsive means 12 is preferably rugged and may be one of several types; I prefer to use so-called thermistor means in the cell 12, and in Fig. 4 I illustrate the employment of two thermistor strips 12—31. The strip 12 responds to radiation collected and focused by the optical head 32, which may be that shown and described in Figs. 1 and 2; but the strip 31 is not exposed to radiation and acts as a compensator for ambient conditions. D.-C. drift and other difficulties may be avoided by deliberately effectively chopping the radiation focussed upon the radiation-responsive strip 12. This may be accomplished electrically by appropriate modulations in the circuit including the strip 12, or, as in the form shown, a mechanical chopping disc 33 may be mounted for rotation so as to interrupt the impingement of radiation upon the strip 12. In the form shown, a small electric motor 34 mounted externally of the housing 10 continuously drives the chopping disc 33 by belt-and-pulley means 35—36—37. A standard 38 may properly position the shaft upon which the chopping disc 33 and its drive pulley 37 are mounted. In Fig. 4, the dotted square wave 32′ schematically represents interrupted radiation passed by the optical head 32 to the exposed thermistor strip 12.

In the form shown, the radiation-responsive thermistor 12 and the compensating thermistor 31 are mounted in conjugate arms of a bridge circuit. Power supply 42 may energize the bridge, and the bridge output may be fed through signal-attenuator means 43 to preamplifier 15; the attenuating means 43 may be included in the preamplifier package 15. The preamplified signal may be fed by a cable (not shown) to a narrow-band amplifier 44 in order to eliminate undesired modulation products, and rectifying means 45 and power-amplifier and attenuator means 46 may shape the envelope of heat-responsive signal appropriately for visual display on a meter 47 and for recording on a conventional recorder 48.

In Fig. 5, I illustrate an alternative optical arrangement providing a more exact basis for quantitative heat measurement, with relatively little additional complexity. The arrangement of Fig. 5 may also be characterized by coincidence of the axis of visual sighting with the axis of the collecting optics for heat-responsive means 50. However, in the arrangement of Fig. 5, the thermistor or other heat-responsive element of the means 50 is alternatively exposed to radiation collected by the optics and to radiation from a regulated reference source 51, which may be a so-called black body of carefully regulated temperature and including optics 52 focussed upon the heat-responsive means 50. The collecting optics shown in Fig. 5 is of the so-called Cassegrain system employing a large concave primary mirror 53 and a small convex secondary mirror 54. Rays collected by the mirrors 53—54 may be passed through an opening 55 in the center of the primary mirror 53 and may be focused at a cross-over point 56, back of the mirror 53; I have shown a reticule 57 at the crossover point, for purposes of pin-point sighting alignment of the device (by means of a viewer 58) upon a particular distant source of radiation to be observed. In order that the heat-responsive means 50 may be exposed alternately to the reference radiation from the source 51 and to the distant radiation collected by the optics 53—54, I employ a chopping disc 59 having a plane mirror surface. Whenever the chopping disc 59 is in position to blanket radiation from the reference source 51, the mirror surface 59′ of the chopping disc may be reflecting the distant-collected radiation upon the heat-responsive means 50; whenever the chopping disc 59 is not reflecting such distant-collected energy, it is effectively open so as to expose the heat-responsive means 50 to the reference source 51. It will be appreciated that by employing the heat-responsive means 50 in conjunction with signal-processing means like that of Fig. 4, one may quantitatively record or observe signals representing the difference between the reference radiation (at 51) and the distant radiation (as focused by the collecting optics).

In Fig. 6, I show a simple readily portable pyrometer instrument having many of the structural features already discussed in connection with Figs. 1 to 3. In the arrangement of Fig. 6, however, the visual-sighting optics does not utilize the main collecting mirror (not shown) for the heat-responsive means 60. Such mirror will be understood to be paraboloidal, as in the case of the mirror 17 of Fig. 1, and contained within the cylindrical housing 61. The heat-responsive means may again be mounted upon a standard 62 carried by the preamplifier housing 63 and received through a slot 64 at the forward end of the cylindrical housing 61. Chopping means 65 for the incident radiation may be driven by an externally mounted motor 66. Even though the visual-sighting optics may not use any part of the collecting optics, parallax difficulties may be avoided by employment of an off-axis sight including a small periscope aligned with the axis of the collecting optics. In the form shown, the visual-sighting means employs an eyepiece 67 on a telescope 68, clamped rigidly to the outside of the housing 61; two 45°-mirror elements 69—70 connected by a tube 71 provide the necessary offset for the periscope, the reflecting axis of the entrance mirror 70 being on the axis of the collecting optics.

Figure 7:
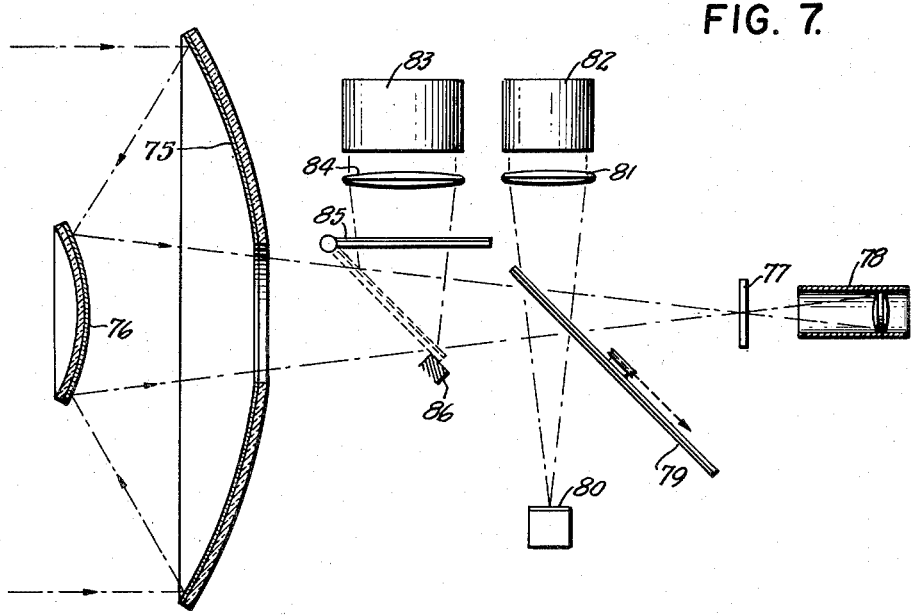
Fig. 7 is an optical diagram schematically illustrating a still further arrangement.

In Fig. 7, I show a more refined pyrometer incorporating certain features over the arrangement shown in Fig. 5. As in the case of Fig. 5, the collecting optics may be a Cassegrain system, with a concave primary mirror 75 and a convex secondary mirror 76, the focal length of the system being relatively long so that the focal point will lie substantially to the rear of the primary mirror. For precise sighting, a reticule 77 may be placed at the focal point, and telescopic viewing means 78 may be placed beyond the focal point. As also in the case of Fig. 5, a rotating-mirror chopping disc 79 may permit heat-responsive means 80 to look alternately at rays projected by the collecting optics 75—76 and at rays projected by the lens 81 of a reference source 82. As thus described, the system of Fig. 7 is the exact duplicate of that of Fig. 5, and recorded or otherwise observed signals emanating from the heat-responsive means 80 will present effectively continuous comparison between the distant radiation and the reference radiation.

In spite of the ascertainable relation (utilizing the parts thus far described in Fig. 7) between the distant radiation and the reference radiation, instrument responsivity remains as an unknown factor. This is particularly true in particular applications in which a restricted portion of the spectrum is being examined, for the heat-responsive means 80 is likely to have various responsivities for various wavelengths. In order to make the responsivity readily ascertainable when desired, even while making a measurement, I may provide what I call a calibrating source 83 which may, like the black body or reference source 82, be a constant radiator of carefully regulated temperature, with optical means 84 for focusing upon the heat-responsive means 80 when desired. In the form shown, a pivotally mounted plane mirror 85 is so arranged as to be normally out of the path of rays projected by the collecting optics 75—76. However, when desired, the mirror 85 may be manually depressed against a stop 86 so as to hold a reflecting position blanking off rays from the collecting optics and casting rays from the calibrating source 83 directly upon the heat-responsive means 80 in a cycle of alternation with rays projected from the reference source 82.

In use, the calibration source 83 is regulated at a temperature of the order of magnitude of the temperature to be observed through the collecting optics, that is, of the order of magnitude of the temperature of the distant source, and the reference source 82 is set for some substantially different temperature. For example, if the distant source to be observed has a temperature of about 100 to 200° C., then the temperature of the calibrating source 83 might be conveniently regulated at 150° C., while the reference source is regulated at about 80° C. Such regulation may be accomplished within 0.1° C. by means not shown or described herein.

In use, with the manually operable mirror 85 in the raised position, the measurable voltage in the heat-responsive means 80 will reflect the difference in radiation between the distant source and the reference source 82. This relationship will be characterized by an instrument responsivity which appears as a constant. When the mirror 85 is depressed, the voltage in the output of heat-responsive means 80 will reflect the difference in radiation between the reference source 82 and the calibrating source 83, and an instrument responsivity will appear as a constant in this relationship. The instrument will presumably have been calibrated initially for a given responsivity, characterizing alternating exposure between the reference source 82 and the calibrating source 83; thus, in field use, if a voltage other than the original calibrated voltage is observed when the mirror 85 is depressed, then the observed percentage voltage change under these conditions will be a measure of the change in responsivity of the instrument, and an appropriate correcting factor will be available for application to the voltage reading obtained when the mirror 85 is retracted out of the way of rays from the collecting optics. More highly refined measurements may be made in this manner.

It will be seen that I have disclosed relatively simple pyrometer constructions featuring ruggedness for the accuracy obtainable. The optical-sighting arrangements and the relative compactness permit easy handling and precise focussing and alignment with sources to be observed, whether at close or distant range. With little additional complexity, means may be provided for more exact quantitative determinations, and instrument responsivity may be checked at any time, thus providing an appropriate correction factor whenever an instrument reading is taken.

While I have described my invention in detail for the preferred forms shown, it will be understood that modifications may be made within the scope of the invention as defined in the appended claims.

I claim:

1. A radiation pyrometer, comprising a housing having an elongated bore open at one end thereof and having an access opening in the wall thereof near said open end, collecting optics including a mirror closing the other end of said bore and facing out the open end on an optical axis generally aligned with that of said bore, a radiation-responsive unit comprising a base and a cell and an elongated thin support mounting said cell remote from said base, said base being longitudinally adjustably secured to said housing with said support passing through said opening and with said cell facing said mirror on said optical axis, whereby said cell may be located at the focal point of said collecting optics, radiation-chopping means between said mirror and said cell for converting radiation focused on said cell into an A.-C. signal, and visual-sighting optics including a periscope having a relatively small pickup element on said optical axis and forward of said cell and forward of said collecting optics at the open end of said housing, said periscope having a sighting element carried by said housing externally of these collimated rays which are collected by said optics and which are focused on said cell, said sighting element being also on an axis parallel to the axis of said collecting optics.

2. A pyrometer according to claim 1, in which said base houses a preamplifier for the output of said cell.

3. A radiation pyrometer, comprising a tubular housing having a closed end and a bore open at the other end, said housing having angularly spaced side-access openings near said open end, a collecting mirror mounted within said closed end on an optical axis generally aligned with that of said bore, a radiation-responsive assembly comprising a base and a cell and an elongated thin standard fixedly mounting said cell remote from said base, means securing said base externally of said housing with said standard passing through one of said openings and with said cell facing said mirror at the focus of said mirror, a radiation-chopping assembly comprising a base and a chopper and an elongated thin standard mounting said chopper remote from said base, means securing said second-mentioned base externally of said housing with said second standard passing through another of said openings and with said chopper between said cell and said mirror, and a visual-sighting periscope assembly including a sighting barrel mounted externally of said housing on an axis parallel to said optical axis, said periscope assembly including a relatively thin offset member extending radially inwardly at the open end of said housing and rigidly supporting a pickup element on said optical axis forward of said cell.

4. A pyrometer according to claim 3, in which the base for said chopping assembly includes drive means for said chopper.

5. A pyrometer according to claim 4, in which a continuous belt connects said drive means to said chopper and extends through said other opening.

References Cited in the file of this patent

UNITED STATES PATENTS

| | | |
|---|---|---|
| 842,314 | Heeley et al. | Jan. 29, 1907 |
| 1,639,412 | Mechau | Aug. 16, 1927 |
| 1,816,047 | Keuffel | July 28, 1931 |
| 1,862,622 | Hoffman | June 14, 1932 |
| 1,976,461 | Prince | Oct. 9, 1934 |
| 2,423,967 | Dalotel | July 16, 1947 |
| 2,441,672 | Ray | May 18, 1948 |
| 2,563,780 | Fontaine | Aug. 7, 1951 |
| 2,601,508 | Fastie | June 24, 1952 |
| 2,650,307 | Koppius | Aug. 25, 1953 |

FOREIGN PATENTS

| | | |
|---|---|---|
| 18,382 | Great Britain | Aug. 24, 1904 |
| 411,891 | Great Britain | June 11, 1934 |